United States Patent [19]

Sanderson et al.

[11] 4,199,265
[45] Apr. 22, 1980

[54] MOTORLESS MAGNETICALLY COUPLED STIRRER

[75] Inventors: Robert A. Sanderson, Northbrook; Patrick S. Chan, Skokie, both of Ill.

[73] Assignee: American Hospital Supply Corporation, Evanston, Ill.

[21] Appl. No.: 955,970

[22] Filed: Oct. 30, 1978

[51] Int. Cl.² .............................................. B01F 13/08
[52] U.S. Cl. .................................................... 366/274
[58] Field of Search .............. 366/273, 274; 310/49 R

[56] References Cited

U.S. PATENT DOCUMENTS

| | | | |
|---|---|---|---|
| 2,641,452 | 6/1953 | Wagner | 366/273 |
| 3,268,785 | 8/1966 | Gerber et al. | 310/491 R X |
| 3,445,741 | 5/1969 | Gerber | 310/49 R X |
| 3,848,363 | 11/1974 | Lovness et al. | 366/273 X |
| 4,040,605 | 8/1977 | Towsend | 366/273 |
| 4,065,708 | 12/1977 | Ulland et al. | 310/49 R X |
| 4,066,947 | 1/1978 | Nakajima et al. | 310/49 R X |
| 4,131,370 | 12/1978 | Lawrence et al. | 366/273 |

Primary Examiner—Philip R. Coe
Attorney, Agent, or Firm—Laff, Whitesel & Rockman

[57] ABSTRACT

A plurality of magnetic field generating, electrical coils are preferably arranged in a circle, in one embodiment. Digitally controlled, recurring switching pulses are generated for sequentially defining a plurality of discrete time periods. During each of these time periods, a separate magnetic field is generated responsive to each switching pulse. The pulses are applied to the coil, in turn, for sequentially stepping a magnetic field in a rotary motion about the circle of coils. In other embodiments, the pole pieces may be arranged in another geometry. For example, they could be linearly positioned to slide a stirrer or to lift a stirrer member up a test tube. A substance which is to be stirred is placed in a non-magnetic container positioned within the stepping magnetic field. A stir rod of magnetic material is placed in the container and within the stepping magnetic field, so that the stir rod couples into and rotates or otherwise moves with the rotary magnetic field. The invention is particularly attractive when used with electronic controllers, such as counters, sequences, sensors, electronic controllers, or the like, since it is much easier for such a electronic devices to control digital pulses than to control analog currents.

20 Claims, 9 Drawing Figures

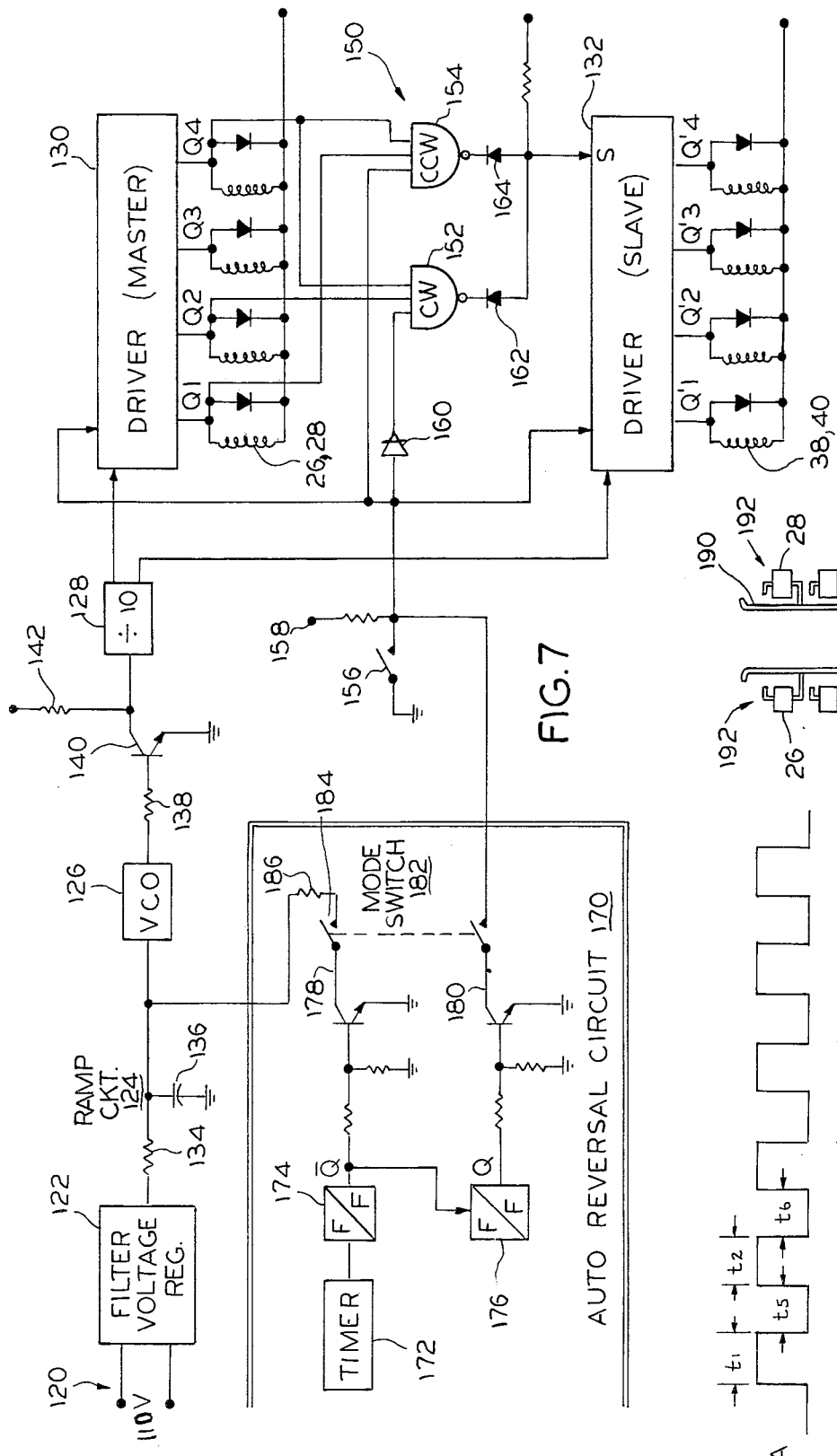
FIG.7
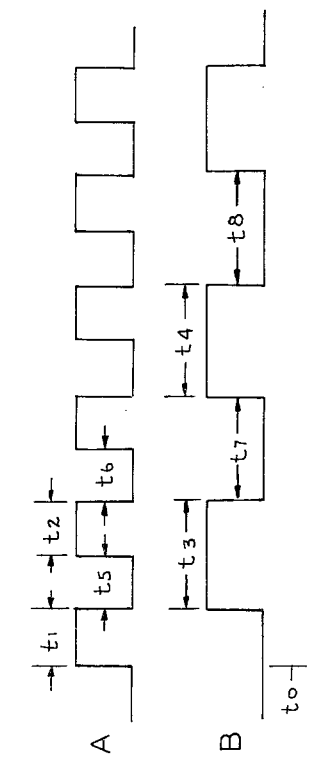
FIG.9
FIG.8

MOTORLESS MAGNETICALLY COUPLED STIRRER

This invention relates to motorless stirrers which may be controlled by a suitable electronic controller and, more particularly, to stirrers which have no moving parts except for a stir rod coupled into a moving magnetic field.

It is often desirable to stir or otherwise agitate a liquid or other mixable material without inserting any unsterilized objects into it. Thus, for example, a container for a medicine may contain a sterile stir rod which is made of a magnetic material placed therein for orbiting about an axis which is more or less at its center of gravity. The orbiting of the stir rod is both powered and controlled by a revolving or otherwise moving magnetic field created beneath the container.

According to one arrangement, a number of magnetic coils are mounted in stationary positions beneath the container. The coils are energized by phased analog currents, whereby each individual coil tends, in sequence, to reverse the magnetic polarity of a field which it generates. This phased analog current creates a revolving magnetic field, which the magnetic rod follows. However, it is difficult for modern electronic controllers to control analog currents.

Another problem is that there is a limit to the number of analog current phases which reliably control the energization of pole pieces. Hence, such a system is limited in the number of pole pieces which it can use, as a practical matter. That limitation upon the number of pole pieces prevents many new stirrer geometry arrangements.

Accordingly, an object of this invention is to provide new and improved motorless stirrers. In particular, an object is to provide such stirrers which may be controlled by electronic equipment, such as controllers, counters, sequencers, sensors, electronic controllers, or the like, for example.

A further object of the invention is to provide new and improved, general purpose, pulse controlled stirrers and similar devices.

Yet another object is to provide a rotating stirrer which may operate at very low speeds, such as 5 rpm, for example.

Still another object is to provide for new geometry stirrers, such as linear devices for moving stir rods back and forth or up and down.

In keeping with an aspect of the invention, these and other objects are accomplished by providing a plurality of pole pieces which are energized in pairs by separate electrical coils for establishing a stepping magnetic field which might rotate, move linearly, back and forth, or up and down. These coils are pulsed in opposed pairs to create such a magnetic field. For example, when the pole pieces are arranged in a circle, the magnetic field rotates. A suitable non-magnetic container is positioned above such a circle of pole pieces in such close proximity that it is well within the magnetic field. A stir rod of magnetic material may then be dropped into the container. As the magnetic field rotates, the bar couples into and follows it to stir any liquid or other material which may be contained therein. If the pole pieces are arranged linearly, the stir rod moves linearly, usually back and forth, but which could also be up and down a tube, for example.

Preferred embodiments of the invention are shown in the attached drawings, wherein.

Figure 1:
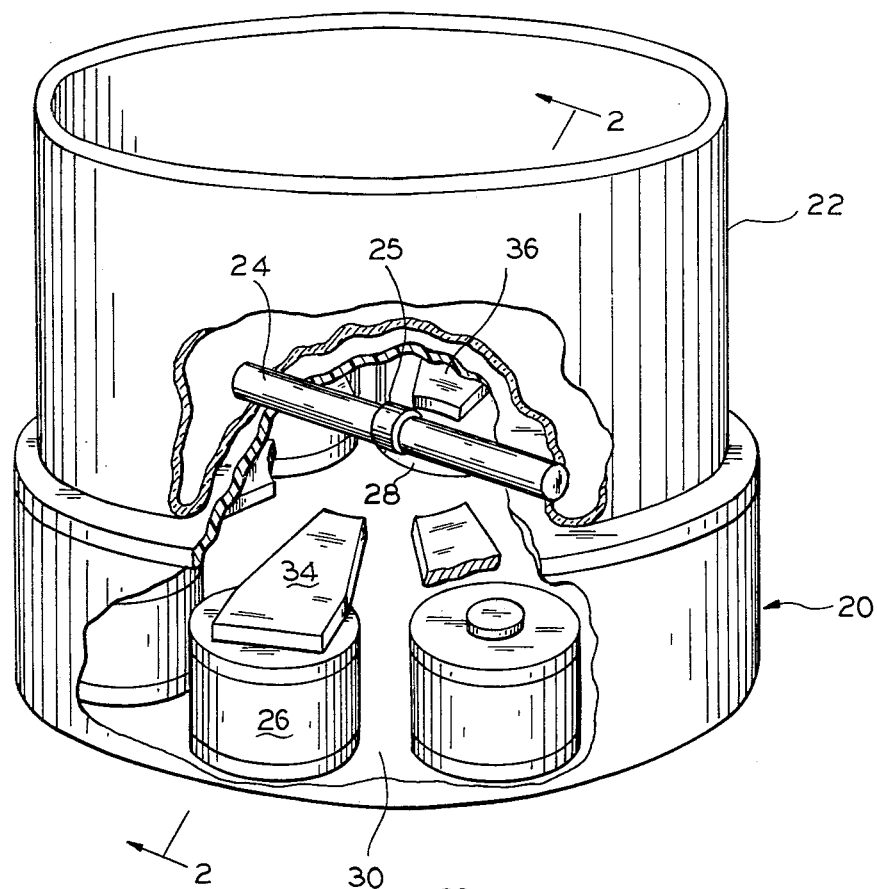
FIG. 1 is a perspective view of an exemplary magnetic stirrer incorporating the invention and arranged for rotary stirring.
Figure 4:
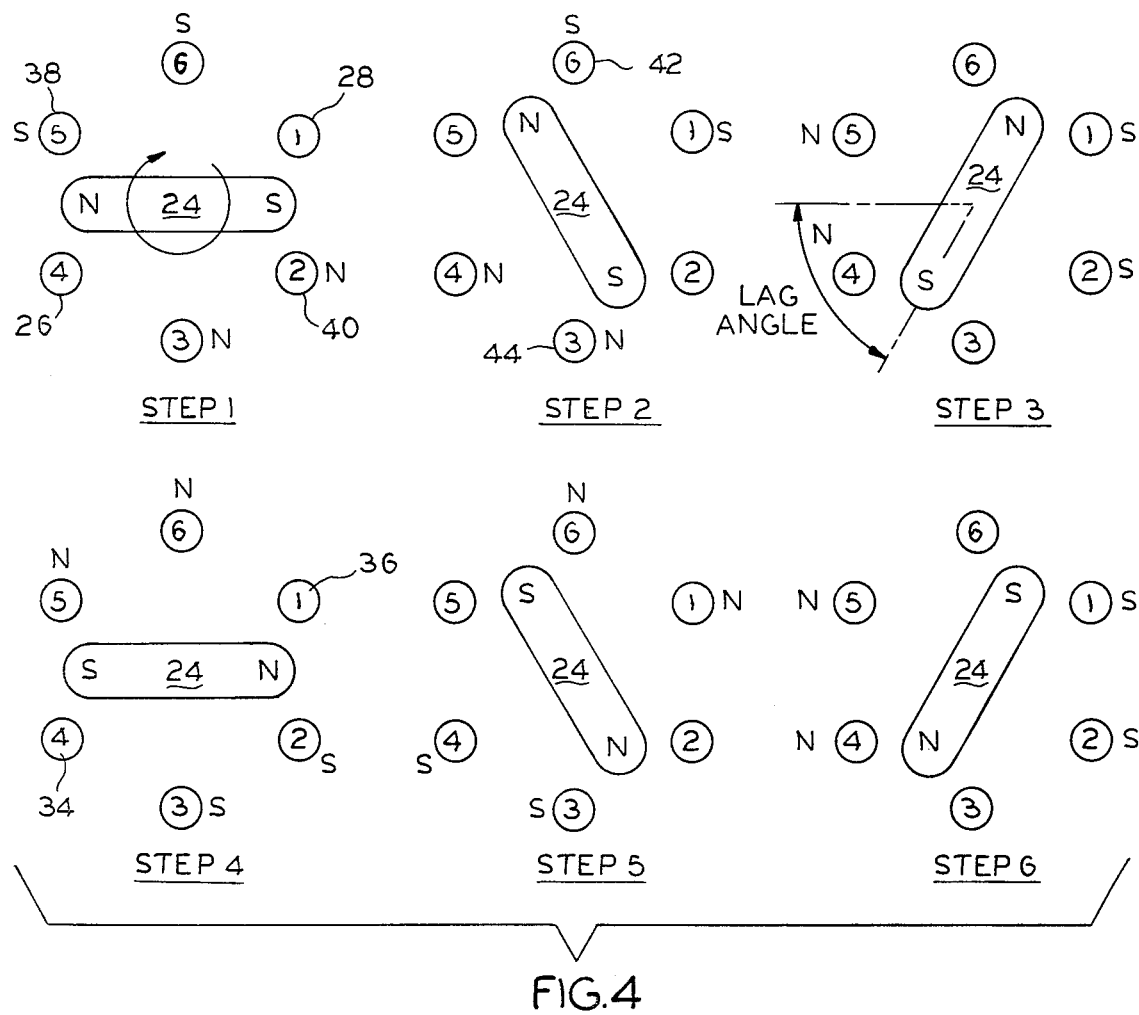
Figure 5:
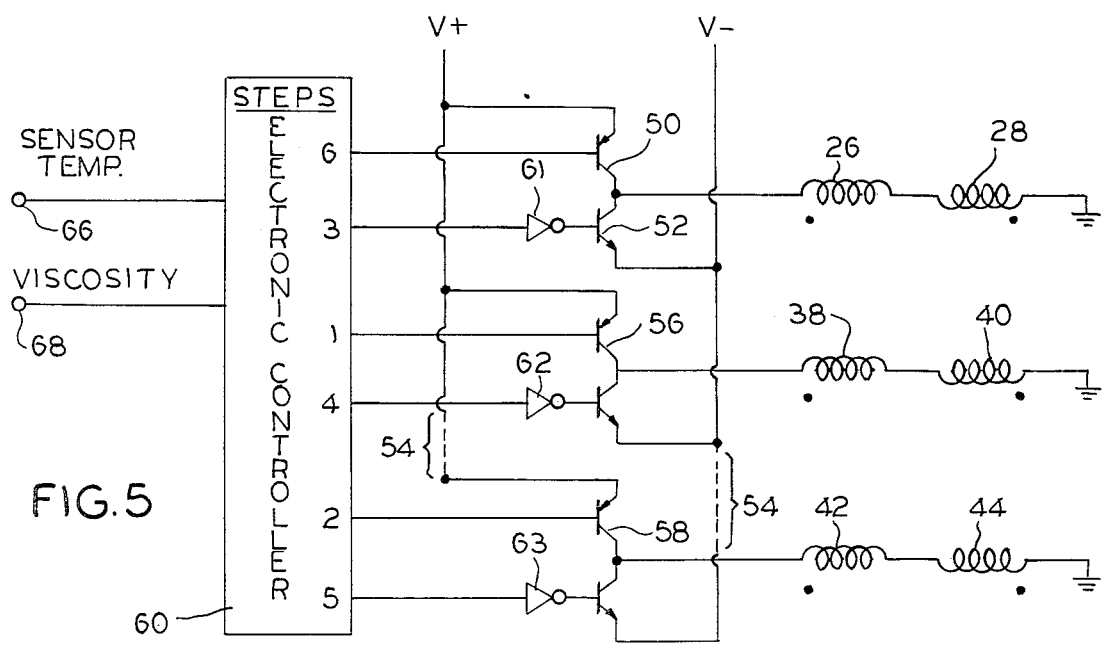
Figure 6:
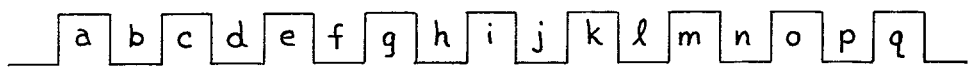
Figure 6:
Figure 6:
Figure 6:
Figure 6:
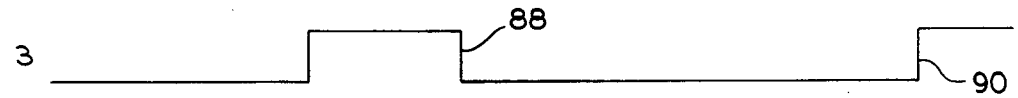
Figure 6:
Figure 6:
Figure 6:
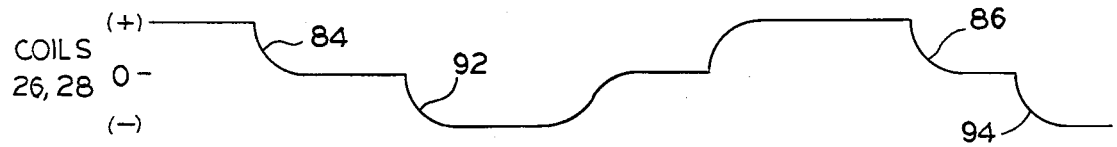
Figure 6:
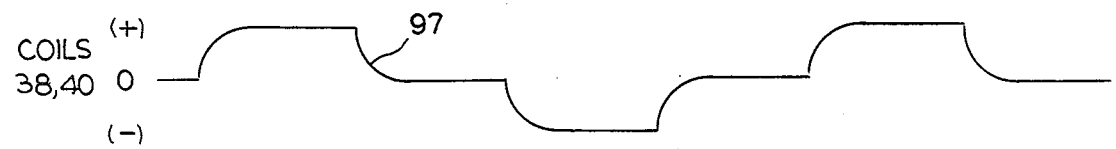
Figure 6:
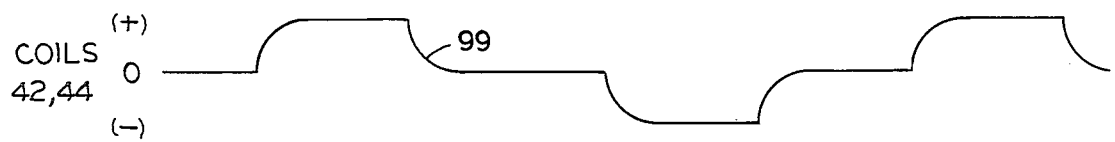

FIG. 4 schematically shows a complete revolution of the stir rod using a very simple arrangement of pole pieces, for ease of explanation;

FIG. 5 is a very simple schematic circuit diagram showing the coils, their gate circuits, and an electronic controller for driving such coils via the gates and illustrating the principles used to drive the stirrer;

FIG. 6 is a graphical representation of the switching pulses which are used to drive the coils of FIG. 1 and of the current appearing in the coils responsive to the switching pulses;

FIG. 7 is a block diagram of a practical circuit for operating the automatic stirrer;

FIG. 8 is a timing chart which is useful for explaining the operation of the circuit of FIG. 7; and FIG. 9 shows an exemplary linear stirrer for moving a stir rod up and down a test tube.

The stirrer 20 shown in FIG. 1 is a simplified device with a suitable, separate container 22 made of non-magnetic material resting thereon. A suitable magnetic means, such as stir rod 24, is resting freely on the bottom of the container 22. If desired, the rod 24 may have an enlarged central or equatorial region 25 to form a bearing surface on which the stir rod may turn. If the stir rod does not have such an enlarged region, it merely rotates with its entire length acting as a bearing surface. Both the stirrer 20 and the container 22 are shown partially broken away to reveal their internal construction.

The stirrer comprises an even number (here, six) of coils mounted in a circle, with the coils diametrically opposed to each other. These coils cooperate in FIG. 1 to produce a rotary stepping magnetic field. One of these coils is numbered 26 and its diametrically opposed coil is numbered 28 in FIGS. 1-3. In some embodiments, another number of coils, such as eight or ten, for example, or more coils may be preferred. Each of the coils preferably has a soft iron core, such as 32,33 (FIG. 2), which is attached at its lower end to a soft iron plate 30 which completes a magnetic circuit between the coils. At its upper end, each core 32 is attached to an individually associated, radially extending pole piece, as pole pieces 34,36 are here shown attached to cores 32,33, respectively.

Figure 2:
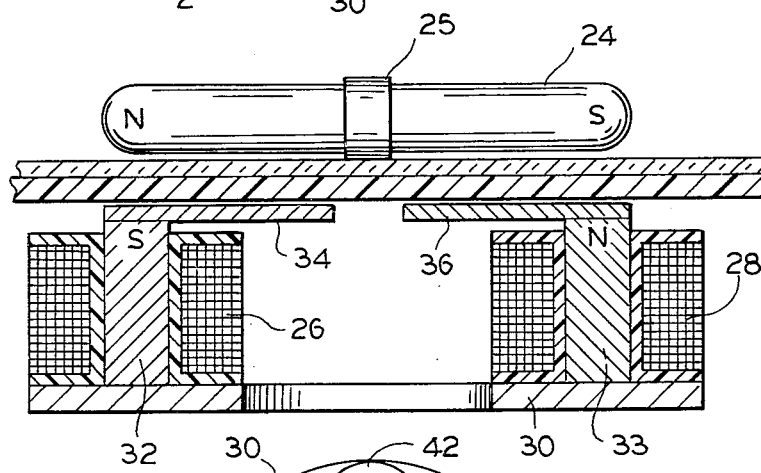
FIG. 2 is a cross section of a fragment of the stirrer taken along line 2—2 of FIG. 1.

From FIG. 2, the magnetic circuit may be traced from the pole piece 34 on the top side of coil 26 through core 32, soft iron plate 30 on the bottom side of coils 26,28, core 33, and pole piece 36 on the top side of coil 28. If the electrical current in the coils 26,28 has one polarity orientation, a south pole is induced at pole piece 34 and a north pole is induced at the diametrically opposed pole piece 36. The stir rod 24 aligns itself so that its north pole moves over pole piece 34 and its south pole moves over pole piece 36.

If the polarity of the current is reversed in the coils 26,28, the induced magnetic polarities reverse so that the pole piece 34 becomes a north pole and the pole piece 36 becomes a south pole. When this happens, the rod 24 reverses its orientation so that its north pole moves toward pole piece 36 and its south pole moves over pole piece 34. In the process, the rod rotates about the bearing formed by the equatorial enlargement 25 or about its center of gravity if there is no enlarged center bearing.

Figure 3:
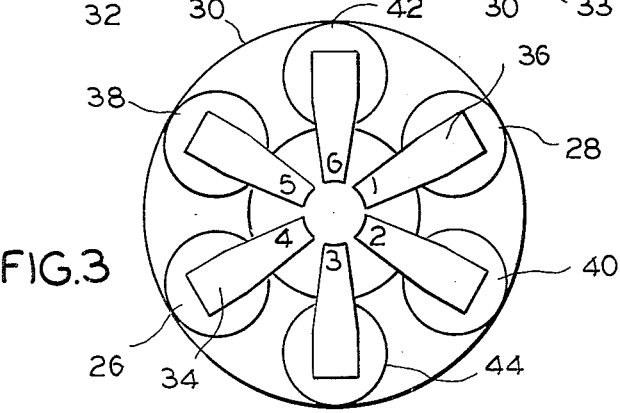
FIG. 3 is a plan view which shows a circle of pole pieces and coils used to drive the magnetic stirrer.

FIG. 3 shows a plan view of the exemplary magnetic stirrer of FIG. 1 with the coils arranged in a circle and pole pieces extending radially toward the center of the circle. The diametrically opposed, radially extending pole pieces are here numbered "1" to "6," in a clockwise order around the circle of pole pieces. Each of these pole pieces, and their individually associated coils, is constructed as described above in connection with coils 26,28, cores 32,33, and pole pieces 34,36. Switching pulses sequentially energize these coils in diametrically opposed pairs to produce a rotary stepping magnetic field.

The stir rod 24 may be stepped around the circle by individually energizing diametrically opposed pairs of coils. This is graphically shown in FIG. 4. At the start of the six-step description of one completed rotation of the rod, the stir rod 24 may be assumed to rest in any given position. For this description, it is assumed that the stir rod 24 was last resting, as shown in FIG. 2, with its north pole over pole piece 34 associated with coil 26 and its south pole over pole piece 36 associated with coil 28. Then, the next switching pulse appears to energize the coils which are the next closest clockwise neighbor of the last energized coil.

On the first step 1, diametrically opposed coils 38,40 are energized so that the pole piece 2 is a magnetic north pole and the pole piece 5 is a magnetic south pole. Coils 26,28 are de-energized so that the magnetic poles disappear at the pole pieces 1 and 4. The north pole end of stir rod 24 is attracted toward pole piece 5 and the south pole end is attracted toward pole piece 2, so that it begins to rotate in a clockwise direction. However, before the stir rod 24 can align with these poles 2,5, the coils 38,40 are de-energized and coils 42,44 are energized to induce north and south poles at pole pieces 3,6, respectively. Thus, the stir rod 24 rotates continuously as it chases the magnetic field around the circle.

Preferably, the timing is such that the adjacent coils are energized during overlapping time periods, which is why each of the letters "N" and "S" appears twice during each step depicted in FIG. 4. Therefore, there is a steady clockwise pull upon the stir rod 24. In other embodiments, using any total number of pole pieces, any suitable number of poles may be either sequentially or simultaneously energized, in any desired pattern. For example, if eight coils are used, four adjacent coils may simultaneously produce four adjacent north poles while the other four adjacent coils simultaneously produce four adjacent south poles. In like manner, any desired pattern of pole piece energizations may be provided.

By an inspection of FIG. 4, it should be apparent how diametrically opposed coils are sequentially energized to move and rotate the induced magnetic poles, step by step, around the circle. The timing, drag, and inertia are such that the stir rod 24 never quite catches up with the pole piece which is then attracting it. The rotational speed may be varied, with precision, over a wide range. The higher speeds are relatively easy to obtain with many different stirrers. However, the inventive stirrer has been reliably driven as slowly as 5 rpm, which is much more difficult to obtain.

Also, it is important to note that the stir rod is supported directly on—but not attached to—the upper side of the bottom of container 22. The stir rod is automatically centered by the magnetic field, regardless of any variation in the container surface. Therefore, there are no bearings to wear out, bind, or cause unpredictable results. Inherently, this means that the system is energy efficient. The inventive system operates reliably over a very wide range of stable speeds, which may be as slow as 5 rpm, without requiring unduly expensive control circuits.

In addition to merely rotating at a fixed stable speed, the system may be programmed to follow any irregular patterns of motion. For example, instead of merely rotating, the stir rod may be programmed to oscillate over a predetermined arc, to go forward, speed up, slow down, reverse, speed up, slow down, go forward, . . . etc.

A very simple circuit for controlling the inventive stirrer is shown in FIG. 5, to illustrate the principles involved. For example, FIG. 5 shows diametrically opposed coils 26,28 as being connected in series and wound in opposite magnetic senses. A pair of opposite polarity type gating transistors 50,52 are connected in series between positive and negative voltage sources V+ and V−, respectively. The series connection of coils 26,28 is, in turn, connected between ground and the collectors of the gate transistors 50,52.

The other coils 38,40,42,44 are connected and gated in a similar manner. Dotted lines 54,54 indicate that any number of coils may be connected in a similar manner, to increase or decrease the number of pole pieces and, therefore, the number of steps in the magnetic stir bar cycle.

When a switching pulse is applied to the base of PNP transistor 50, it switches on to connect the positive voltage source V+ to the coils 26,28. Depending upon the direction of the coil turns, opposite magnetic poles are induced in pole pieces 34,36 (FIG. 2). For example, pole piece 34 may be a south pole and pole piece 36 may be a north pole, thereby conforming to the disclosure of FIG. 2.

When the next switching pulse appears at step 1 (FIGS. 4,5), the PNP transistor 56 switches on to connect the voltage source V+ to energize diametrically opposed coils 38,40, in series. This makes pole pieces 2 and 5 north and south, respectively, as shown in step 1 of FIG. 4. On step 2, the switching pulse appears at the base of PNP transistor 58 to connect the voltage source V+ to energize the coils 42,44 in series, and to make poles 3 and 6 north and south, respectively, as shown in step 2 of FIG. 4.

On step 3, the magnetic polarity of the pole pieces 1,4 must be reversed, as compared to the polarity in the initial state shown in FIG. 2. Therefore, a switching pulse appears on the base of the NPN transistor 52 which switches on to connect the voltage source V− to the coils 26,28. Current now flows between the V− voltage and ground, via the series windings of coils 26,28. Since the energy comes from the V− source, the magnetic polarities are reversed as compared to the magnetic polarities which appear when the transistor 50 is switched on. The magnetic polarities are thus reversed to produce the stir rod position of step 3 (FIG. 4), which is diametrically opposite to the rod position in step 2.

By an inspection of FIG. 4, it should now be apparent how each of the remaining steps 4–6 are produced. Step 6 is the same as that shown in FIG. 2, which both preceded and is followed by step 1.

Those who are skilled in the art will readily perceive how various biasing circuits may be added to the transistor circuits of FIG. 5; therefore, they have been omitted for simplifying the disclosure. Also, it should be apparent that, instead of reversing the applied voltage polarity, two windings may be turned in opposite directions on each core. One winding is then energized from a voltage source to produce one magnetic polarity. The other winding is energized from the same voltage source to reverse the polarity. An advantage of two windings on one core is that the power supply does not require two voltages (V+ and V−), but may operate with a battery of only one polarity.

Also, as those who are skilled in the art will readily perceive, any suitable electronic controller 60 may be wired or programmed to control the manner in which the coils are energized by applying switching pulses to the terminals connected to the bases of the transistors 50,52, ... etc. It may be desirable to apply the pulses to one of the transistor types (here, NPN) via voltage polarity inverters 61,62,63. If desired, one or more sensors may be provided to signal certain process information to the electronic controller 60. Here, by way of example only, FIG. 5 shows a temperature sensor 66 and a viscosity sensor 68. Any other suitable sensors may also be provided. The outputs of these sensors may be connected to the electronic controller 60, which may, in turn, be arranged to control its output of switching pulses in some uniquely desired manner.

FIG. 6 illustrates one manner in which the electronic controller 60 may control the overlapping energization of the coils in order to drive the stir rod in a simple circular pattern, as shown in FIG. 4. In greater detail, any suitable source, such as a free-running multivibrator (not shown), produces a train of cyclically recurring clock pulses 70, which define successive clock pulse periods, here identified "a–," by way of example. These pulse periods are counted and divided in any suitable manner; here the ratio is 3:1. Therefore, the electronic controller 60 pulses each of its output terminals 1-6 for intervals equal to three successive clock pulse periods. Accordingly, as shown at 72 in FIG. 6, the terminal "6" is pulsed during an interval equal to three clock pulse periods ending with "a" and during the three clock pulse periods "k–m". The terminal "1" is pulsed during an interval equal to clock pulse periods "a–c" and "m–o". The remainder of the electronic controller output terminals are pulsed during overlapping intervals, which should be apparent from a study of FIG. 6.

By comparing FIGS. 5 and 6, it should be apparent that coils 26,28 (FIG. 5) are energized from positive voltage V+ during step 6, while transistor 50 is switched on. The electronic controller 60 produces switching pulses 80,82 (FIG. 6) at its output terminal "6" during intervals controlled by clock pulse periods "a" and "k–m." During these intervals, switching pulses 80,82 cause current to be applied from positive voltage source V+ to coils 26,28 as indicated at 84,86 (FIG. 6). From FIG. 5, it is apparent that the coils 26,28 are energized so that there is current from negative source V− when the electronic controller 60 is applying switching pulse to its output terminal "3" and energizes the base of NPN transistor 52 via inverter 61. The switching pulses 88,90 appear at electronic controller output terminal "3" during clock pulse periods "e–g" and "q". Therefore, the coils 26,28 are energized with negative polarity during the intervals 92,94. During intervals 84,86, current is from the positive polarity voltage source V+, and the magnetic field has one polarity. During intervals 92,94, current is from the negative polarity voltage source V−, and the magnetic polarity field reverses.

The remainder of the switching pulses, and their effect upon the coils, is apparent from an inspection of FIG. 6.

By a comparison of FIGS. 4 and 6, it should be apparent how the overlapping switching pulses produced by the electronic controller 60 rotate the magnetic field and, therefore, the stir rod 24. Step 1 (FIG. 4) shows that poles 2 and 3 are magnetic north and that poles 5 and 6 are magnetic south. Each of the other steps also is shown as having two adjacent pole pieces magnetized simultaneously. This also shows up in FIG. 6, where the switching pulses overlap each other. For example, during clock period "a," switching pulses 80,96 overlap so that coils 26,28 and 38,40 are simultaneously energized (84,97) from positive voltage V+. This way, the magnetic flux built under control of switching pulse 96 appears before the flux built under control of the switching pulse 80 disappears. Likewise, during clock period c, the switching pulses 96,98 overlap, which simultaneously energizes coils 38,40, and 42,44 from a positive voltage V+, as shown at 97,99.

Accordingly, there is a smooth and overlapping transistion of magnetic poles from pole piece to pole piece to smoothly rotate the stir rod.

FIG. 7 shows a practical example of a drive circuit which may be used to control the inventive stirrer, using the principles set forth above. In greater detail, the major circuit components of FIG. 7 include any suitable power source 120 (which may be standard 110 v, 60 Hz commercial power), a voltage regulator 122, a ramp circuit 124, a voltage-controlled oscillator 126, a pulse divider 128, and a pair of driver circuits 130,132.

The voltage regulator 122 may include any suitable filtering circuits for producing a smooth, well-regulated voltage supply.

The output of the voltage regulator 122 is connected to a ramp circuit 124 which comprises a current limiting resistor 134, and a capacitor 136. When the voltage is applied through resistor 134, the capacitor 136 charges over a period of time which is determined by the size of the resistor 134. Thus, as the charge builds on the capacitor 136, the voltage slowly increases at the input of the voltage-controlled oscillator 126, until the capacitor 136 reaches its full charge. Then, there is a stable voltage at the input of oscillator 126.

A voltage-controlled oscillator is a circuit which increases its output frequency as its input voltage increases. Thus, it is clear that, as the capacitor 136 charges, the output frequency of oscillator 126 also increases. When the charge on the capacitor 136 reaches a stable level, the oscillator output frequency is also stable.

The output of the voltage-controlled oscillator 126 is applied through a current-limiting resistor 138 to the base of a transistor 140. The circuit including transistor 140 is a voltage level shifter. Transistor 140 acts as an electronic switch, interrupting a voltage applied through load resistor 142 to the input of the frequency divider circuit 128. The interruptions occur at a rate and duty cycle set by the output frequency of the voltage-controlled oscillator 126.

A suitable pulse divider circuit 128 is arranged to convert the pulses received from transistor 140 into a different frequency, which is required to obtain a desired stirring speed. For example, if the voltage-controlled oscillator 126 has an output frequency of 500 cycles per second, when the capacitor 136 is fully charged, a ten-to-one divider produces output pulses at a rate of 50 cycles per second.

The two drive circuits 130,132 are preferably integrated circuits for performing functions somewhat as described above in connection with FIG. 5. The magnetic field is stepped in a manner which should be apparent from the description of FIG. 5.

In greater detail, the output Q1 of the driver 130 energizes a series circuit including the two coils 26,28 for producing diametrically opposed magnetic poles. About a half or two-thirds or any other convenient amount of a clock pulse later (as shown in FIG. 6); the driver 132 energizes a series circuit including the coils 38,40 via its output terminal Q'1. Therefore (from FIG. 3), the stir rod will move with a clockwise rotation if the output Q'1 follows the output Q1.

On the other hand, if the timing is such that the output Q'1 leads the output Q1, the stir rod advances from the field of coils 38,40 to the field of coils 26,28 and the stir rod rotates counterclockwise.

In order to synchronize the outputs of the driver circuits 130,132, a steering circuit 150 is provided in the form of two NAND circuits 152,154, here marked "CW" (clockwise) and "CCW" (counterclockwise), respectively. In greater detail, the circuit 130 acts as a master and the circuit 132 acts as a slave.

When switch 156 is open, the high voltage at 158 is applied to enable the NAND gate 154 at its left-most input terminal. The same high voltage 158 is applied through inverter 160 to inhibit the NAND gate 152, at its left-most input terminal.

When the master circuit 130 applies simultaneous high signals to its output terminals Q1,Q4, the "counterclockwise" NAND gate 154 applies a pulse through an OR gate diode 164 to a set terminal S on the slave circuit 132. The circuit 132 immediately sets itself to a predetermined state which is synchronized with the state of circuit 130 at the instant when the NAND gate 154 conducts. Thereafter, the magnetic field rotates in a counterclockwise direction.

To reverse the direction of stirring, the switch 156 may be closed to substitute the "low" or ground for the high voltage 158. When this occurs, the output of the inverter 160 goes to a high voltage to enable the clockwise gate 152. The removal of the high voltage 158 from the counterclockwise gate 154 inhibits it. This time, the gate 152 applies a pulse through the OR gate diode 162 at the instant when the master driver simultaneously applies signals to its output terminals Q2,Q4. At that instant, a pulse is applied to the set terminal S on the slave driver 132, which immediately sets itself to its predetermined state. Thereafter, the two drivers have output signals which are interrelated to produce a magnetic field which rotates in a clockwise direction.

Sometimes, it is desirable to program the stirrer to rotate the stir rod in some other manner. To illustrate how this is done, FIG. 7 has been drawn to include an automatic reversal circuit 170, which may be an optional circuit to be added to the circuitry described thus far. Other, somewhat similar, circuits may also be provided to program different stirring patterns.

The component parts of the autoreversal circuit 170 include a timer 172, a pair of flip-flop circuits 174,176 and a pair of driver transistors 170,180. The timer 172 is a free-running oscillator for continuously producing an output train of clock pulses, as long as the circuit is energized.

The flip-flop 174 changes its output state at its terminal $\overline{Q}$, responsive to each clock pulse that it receives. While any suitable timing may be provided, an 8-second on/8-second off flip-flop cycle might be considered exemplary.

The $\overline{Q}$ output of the flip-flop 174 drives the flip-flop 176. Therefore, in the above-cited 8-second example, the output at the Q terminal of flip-flop 176 changes its state every 16 seconds. This relationship is seen in FIG. 8 where line A represents the output at the terminal $\overline{Q}$ of flip-flop 174, and line B represents the output at the terminal Q of the flip-flop 176.

When there is an output pulse at either of the flip-flop terminals, a signal is applied to the base of a transistor (transistor 178, for circuit 174; transistor 180, for circuit 176). These transistors remain on for the duration of the pulses which cause them to switch on. Thus, the transistor 178 is switched on during each of the time periods t1,t2 . . . in FIG. 8A. The transistor 180 is switched on during each of the time periods t3,t4 of FIG. 8B.

To operate the auto reversal circuit 170, a mode switch 182 is operated to complete circuits from the collectors of the transistors 178,180. When the transistor 178 switches on (times t1,t2 . . . FIG. 8A), ground is applied from its emitter through its collector, contacts 184 and resistor 186 to the ramp circuit 124. The capacitor 136 discharges at a rate fixed by the resistance 186. During the resulting time period, the frequency of the voltage-controlled oscillator 126 decreases as a function of the decreasing voltage on the capacitor 136. During the periods t5,t6, . . . (FIG. 8A), the transistor 178 switches off and the capacitor 136 charges at a rate set by the value of resistor 134. The output frequency of the voltage-controlled oscillator 126 increases as a function of the increased voltage on the capacitor 136.

It should now be clear that the stir rod slows down during time t1, speeds up during time t5, slows down during time t2, speeds up during time t6, etc. The timing of the charge and discharger cycle periods may be selected by varying resistances 134,186 according to the needs of the stirred material. It is presently thought that, most often, this cycle will be set to produce a maximum turbulence for the stirred material.

Each time that the transistor 180 switches on, ground is applied to the contact of switch 156 to reverse the direction of stirring, as described above when the switch 156 closes. Hence, the magnetic field rotates in a counterclockwise direction during time periods t3,t4. While transistor 180 is on, the field rotates in a clockwise direction during time periods t7,t8.

From FIG. 8, it is seen that at the start of the curves (time O), the stirrer is rotating clockwise at maximum speed. It slows during time t1 to the lowest speed near the end of the time period. At the start of time t3, the stirrer reverses and begins to rotate in a counterclockwise direction speeding up during time t5 and reaching a maximum speed near the end of the time period t5. During time period t2, the stirrer begins to slow down, coming to the lowest speed near the end of the time period t2. Then, the direction reverses to become clockwise at the start of the time period t7. The stirrer speeds up during the time period t6. The cycle repeats endlessly, as long as mode switch 182 is closed.

It should be apparent that other stirring patterns could be provided in a similar manner.

It should also be apparent that the geometrical arrangement of the coils and pole pieces may be modified to create different stirring patterns. For example, FIG. 9 shows a vertical column 190 (it could just as well be a horizontal column), which could be a test tube or any other suitable column. The coils 192,194 and pole pieces are stacked vertically around the test tube. They may also spiral up the height of the test tube. Thus, the stir rod 196 may move up and down the column, spiraling along the way. This is only one of many different examples which could be cited of the many variation in the geometry of the coils and pole pieces.

Some of the advantages of the invention should now be apparent. The configuration of the stirrer of FIG. 1 lends itself to a very low physical profile of, say, two inches or less. The electronic controller is able to control the rotational rod speed quite accurately over an extremely wide range of speeds, from very low to very high speeds. The electronic controller may be programmed or arranged to cause the stir rod to undertake almost any form of motion: linear, rotary, reversing, accelerating, decelerating, oscillating, and combinations thereof. The unit may be designed to withstand wide ranging environmental conditions, in order to operate on hot plates, in refrigerators, or the like. The same basic units may be made in any of many sizes, at almost the same low cost. In some cases, multiple units may be able to provide unusual processing capabilities.

Those who are skilled in the art will readily perceive how to modify the system. Therefore, the appended claims are to be construed to cover all equivalent structures falling within the true scope and spirit of the invention.

We claim:

1. A digitally controlled motorless stirrer comprising means for generating cyclically recurring pulses, electronically controlled means for establishing a stepping magnetic field responsive to said recurring pulses, a container, a magnetic stir rod positioned in said container and against a surface thereof made from a non-magnetic material, and means for supporting said surface of said container within said magnetic field in a position where said magnetic stir rod follows the stepping of said magnetic field.

2. The stirrer of claim 1 wherein said means for establishing a magnetic field comprises a plurality of coils positioned in a predetermined geometrical arrangement beneath said stir rod supporting surface, a plurality of pole pieces associated with each of said coils and extending in the predetermined arrangement toward said container, and means associated with each of said coils for completing a magnetic circuit between said coils.

3. The stirrer of claim 2 and means for applying said recurring pulses to adjacent ones of said coils in an overlapping pulse relationship whereby magnetic flux is built by an energization of each individual one of the coils before the magnetic flux built by its immediately neighboring coil disappears.

4. The stirrer of claim 2 and programmable means for controlling the generation and the application of said pulses to said coils.

5. The stirrer of claim 2 wherein said stir rod has an enlarged equatorial region forming a bearing surface on which said stir rod may turn.

6. The stirrer of claim 1 wherein said predetermined geometrical arrangement is a circle of pole pieces beneath said surface for creating a rotary magnetic field.

7. The stirrer of claim 1 wherein said predetermined geometrical arrangement is a row of pole pieces for creating a sweeping linear magnetic field for moving said stir rod in at least a linear motion along said linear field.

8. A method for controlling the stirring of a fluid or similar mixable substance comprising the steps of:
   a. generating digitally controlled, recurring switching pulses for sequentially defining successive discrete time periods;
   b. generating successive magnetic fields responsive to said switching pulses, for sequentially stepping a magnetic field in a predetermined motion;
   c. positioning an integral non-magnetic container including the substance to be stirred within said stepping magnetic field; and
   d. positioning a magnetic stir rod which is entirely separate from said container in said container and within said stepping magnetic field, whereby said rod moves with said magnetic field in order to stir said substance.

9. The method of claim 8 and an added step wherein said switching pulses of step a. are generated and applied under control of a programmable means, whereby said magnetic stir rod may be programmed to follow a great variety of different patterns of movement by generating and applying said switching pulses in a different order.

10. The method of claim 9 and the added step of generating and applying said switching pulses in overlapping relationships.

11. The method of claim 9 wherein said switching pulses are generated at a recurrence rate relative to the inertia of said stir rod which causes the switching pulses to lead the stir rod as it moves, so that said rod moves continuously and does not come to rest at any pole piece.

12. The method of claim 11 and the step of changing said recurrence rate with a ramp function whereby said pulses recur at an increasing or decreasing rate which varies as a function of the inertia of the stir rod so that it may accurately follow said magnetic field.

13. The method of claim 12 and the step of changing the direction of the magnetic field stepping each time that said recurrence rate slows.

14. An automatic stirrer comprising a circle of paired coils, each of said pair of coils being diametrically opposed in said circle, said coils being wound in directions to produce magnetically opposed flux fields, whereby one of said pair induces one magnetic pole when the opposite of said pair induces the opposite magnetic pole responsive to an energization of the pair of coils, digital means for sequentially generating switching pulses for energizing each of said pair of coils in a predetermined order around said circle, means for alternatively reversing the relative positions of said opposite magnetic poles when each of said pair of coils is energized, a free magnetic stir rod, means for supporting said stir rod in the magnetic fields created by said coils and means for varying the characteristics of said switching pulses to coordinate their generation with the inertia characteristics of said stir rod.

15. The stirrer of claim 14 and means for varying said predetermined order to cause said rod to follow any of many alternative patterns of rod motions.

16. The stirrer of claim 14 wherein said digital means comprises two driver means, each of which controls the energizing sequence of one half of said coils, steering means for synchronizing said two drivers to energize said coils in either of two orders for driving said stir rod in either of two directions.

17. The stirrer of claim 16 and timer means for cyclically operating said steering means to sequentially reverse the directions in which said stir rod is driven.

18. The stirrer of claim 17 wherein said digital means also includes a pulse source having a variable pulse repetition rate, and means controlled by said timer for varying said variable repetition rate in a manner which speeds up the movement of said stir rod after each operation of said stir rod after each operation of said steering means and slows down said movement of said stir rod before each operation of said stir rod.

19. A stirrer comprising a plurality of linearly-oriented, magnetic pole pieces, digitally controlled means for sequentially energizing said pole pieces to create a linearly moving magnetic field, means for positioning a mixable substance in said field, and a magnetic stir rod positioned with said mixable substance for moving said mixable substance linearly as said stir rod moves back and forth past said linearly-oriented pole pieces.

20. A digitally controlled device comprising a plurality of electromagnetic means positioned to generate separate magnetic fields in a geometrical pattern, a magnetic stir rod, a non-magnetic surface positioned to support said stir rod under gravity adjacent said plurality of magnetic means with an orientation wherein said pattern of magnetic fields coincides with said surface, and digital control means for selectively and individually energizing said electromagnetic means to step said fields in said pattern whereby said stir rod moves in the pattern established by the stepping of said field.

* * * * *